United States Patent
Fujinami et al.

(10) Patent No.: US 6,210,838 B1
(45) Date of Patent: Apr. 3, 2001

(54) SUBSTRATE FOR ION CONDUCTOR AND ION CONDUCTOR

(76) Inventors: Tatsuo Fujinami, 1618-34, Tomizuka-cho, Hamamatsu-shi, Shizuoka-ken, 432-8002 (JP); Mary Anne Mehta, 1873-4, Tomizuka-cho, Hamamatsu-shi, Shizuoka-ken, 432-8002 (JP)

(*) Notice: Subject to any disclaimer, the term of this patent is extended or adjusted under 35 U.S.C. 154(b) by 0 days.

(21) Appl. No.: 09/124,904

(22) Filed: Jul. 30, 1998

(30) Foreign Application Priority Data

Jul. 31, 1997 (JP) .................................. 9-206506

(51) Int. Cl.[7] ................................................ H01M 6/18
(52) U.S. Cl. ...................... 429/304; 429/303; 429/188; 429/310; 429/311; 429/317; 429/251; 525/403
(58) Field of Search .................... 429/188, 303, 429/304, 310, 311, 317, 251; 525/403

(56) References Cited

FOREIGN PATENT DOCUMENTS

| 0 856 901 | 8/1998 | (EP) . |
|---|---|---|
| 8-45794 | 2/1996 | (JP) . |
| 8-339827 | 12/1996 | (JP) . |
| WO 97/16862 | 5/1997 | (WO) . |

OTHER PUBLICATIONS

D. Benrabah et al., "Perflurorsulfonate–Polymer Based Single Ion Conductors," *Electrochimica Acta*, vol. 40, pp. 2259–2264, (1995).

George L. O'Connor et al., "The Boric Acid Dehydration of Alcohols," vol. 77, pp. 1578–1581, Mar. 20, 1955.

M.F. Lappert, "Cyclic Organic Boron Compounds. Part II.[1] Chemical Properties of n–Butyl Metaborate," pp. 3256–3259 (1958).

E.W. Abel et al., "The Trialkylsilyl Esters of Boron," pp. 690–693 (1959).

Arthur Finch et al., "Boron Ring Compounds. A New Series," vol. 26, pp. 3250–3253 (Sep. 1961).

N. Venkatasubramanian et al., "Synthesis and characterization of spinnable sol–gel derived polyborates," *Journal of Non–Crystalline Solids* 130 (1991) pp. 144–156, North Holland.

Bruce Wade et al., "Synthesis of Fiber Forming Polyborates," *Polym. Mat. Sci–Eng.*, vol. 64 (1991), pp. 377–378.

Bruce Wade et al., "Boron Nitride Fibers From Polyborates," Poly. Prepr. (1991), 32(3), pp. 554–555.

N. Venkatasubramanian et al., "Synthesis and Characterization of Spinnable Sol–Gel Derived Polyborates," *Polym. Mater. Sci. & Eng.*, vol. 62 (1990) pp. 614–619.

S.S. Zhang et al., "A Novel Electrolyte Solvent for Rechargeable Lithium and Lithium–Ion Batteries", *J. Electrochem. Soc.*, vol. 143, No. 12, Dec. 1996, pp. 4047–4053.

Eliana Quartarone et al., "Sol–Gel Synthesis, Thermal Characterization and Conductivity of New Glass–Polymer Solid Electrolytes," *Journal of Thermal Analysis*, vol. 47 (1996) pp. 235–245.

D. Benrabah et al., "Perfluorosulfonate–Polyether Based Single Ion Conductors," Electrochimica Acta, vol. 40, No. 13–14 (1995) pp. 2259–2264.

Mehta, M.A. et al, "Chemistry Letters" vol. 9, Jul. 31, 1997, pp 915–916, XPOO2085988, Japan.

*Primary Examiner*—Laura Weiner
(74) *Attorney, Agent, or Firm*—Burns, Doane, Swecker & Mathis, LLP

(57) ABSTRACT

A substrate for an ion conductor includes a polymer or molecule capable of sustaining ion conduction, and a boroxine ring. The above mentioned polymer or molecule participates in and promotes ionic conduction. The boroxine ring is bonded to the above mentioned polymer or molecule, and captures anions resulting from dissolution of a salt. An ion conductor includes the substrate, and a salt combined with the substrate. In the ion conductor, the anions resulting from the salt are captured by the boroxine ring, but the cations resulting therefrom are transported. Thus, ion conduction where the majority of charge is carried by the cations occur. As a result, cation transport numbers far greater than usually observed can be achieved.

14 Claims, 5 Drawing Sheets

RELATIVE BOROXINE RING CONTENT

SUBSTRATE FOR ION CONDUCTOR AND ION CONDUCTOR

BACKGROUND OF THE INVENTION

1. Field of the Invention

The present invention relates to a substrate for an ion conductor, and an ion conductor. The substrate when combined with the salt can be applied to solid conductors for batteries.

2. Description of the Prior Art

There has been expectation that ion conductive polymers can be applied to the field of electrochemistry, for example, to all solid state lithium secondary batteries, etc., because ion conductive polymers are readily processed into thin films, light-weight, and flexible. It is known that polyethylene oxide complexes of alkali metal salts are useful materials to make batteries, because the complexes exhibit ion conduction. Accordingly, systems have been investigated in which alkali metal salts which exhibit good dissociation are dissolved in polymers having polyether chains. Motion of the polyether chains promotes cation conductivity. However, polyethylene oxide exhibits high crystallinity, and low ion conductivity at room temperature. Consequently, in order to improve the mobility of the polymer-chain segments responsible for promoting ion conductivity, comb-shaped polymers have been developed. In the comb-shaped polymers, polymethyl methacrylate, polysiloxane, or polyphosphasene constitutes the main chain, and oligo ether chains are introduced into the main chain to constitute side chains. In particular, in order to reduce the temperature dependence of ionic conductivity, other systems have attracted engineer's attention in which oligoether side chains are introduced into polyether main chains in a dendritic fashion.

In the complexes of ether based polymers and alkali metal salts, however, not only the cations but also the anions are likely to move. When an electrode blocking with respect to anions is used, the anions accumulate at the interface with the electrode and the dc ionic conductivity decreases as time elapses. Therefore, single ion conductors, in which only cations move, are better than other ion conductors in terms of the application of ion conductors to batteries. In order to obtain single cation conduction, it is necessary to fix the anions to the polymer chains. In this case, ion pairing between the cations and fixed anions hinders the motion of the cations, thereby reducing the mobility of the cations. As a result, the ion conductivity decreases sharply in systems where anions, such as carboxylate or sulphonate groups, are introduced into the polymer chains.

It is possible to think of the following counter-measures in order to reduce the influences of the ion pairing: introduction of electron-withdrawing groups into polymer chains to reduce the electron density on the anions; introduction of bulky groups into the polymer chains to sterically hinder the approach of the cations towards the anions; and reduction of the distance between the fixed anions in order to reduce the activation energy required for cation movement.

Several ideas have been proposed to reduce the influence of ion pairing, because the presence of fixed anions reduces the cation mobility as described above. For example, Japanese Unexamined Patent Publication (KOKAI) No. 8-339,827 discloses the introduction of electrophilic groups into polymer chains to attract the electrons at the center of the anions, thereby lowering the electron density at the center of the anions. Accordingly, the electrons are less easily removed from the anions which are thus inhibited from being oxidized. However, the proposal fails to produce a single ion conductor, because the anions are not fixed therein.

In the literature, D. Benrabah, S. Sylla, F. Alloin, J. M. Sanchez, M. Armand, Electrochim. Acta., 40, 2259 (1995) report a system in which lithium sulfonate is fixed to a polymer. The lithium sulfonate is substituted with a fluoroalkyl group, and works as an electron-withdrawing group.

However, these conventional proposals are based on fixing anions onto the polymers. In other words, the resulting polymers have a structure in which the anions are fixed onto the polymers during the synthesis. It is necessary to carry out difficult reactions in order to synthesize the polymers in which the anions fixed therein.

SUMMARY OF THE INVENTION

The present invention has been developed in view of the aforementioned circumstances. It is therefore the object of the present invention to provide a substrate for an ion conductor, and an ion conductor which shows enhanced single ion conduction at room temperature.

A substrate for an ion conductor according to the present invention comprises:

a polymer or molecule capable of sustaining ion conduction; and a boroxine ring bonded to the above mentioned polymer or molecule capable of sustaining ion conduction, and which captures anions resulting from a dissolved salt.

An ion conductor according to the present invention comprises:

the aforementioned present ion conductor substrate; and a salt combined with the substrate.

The present ion conductor is a combination of the present ion conductor substrate and a salt. The boroxine ring structure is present in the molecules or polymers of the ion conductor. Boron atoms in the boroxine ring are electron pair acceptors and the boroxine ring accordingly strongly interacts with the anions (i.e., acts as an anion trap). Thus, when the salt is dissolved in the present ion conductor substrate, the resulting anions are captured by the boroxine ring. Thus, in the present ion conductor, the proportion of charge transported by the cations is greatly enhanced. As a result, high cation transport numbers can be obtained for these ion conductors.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
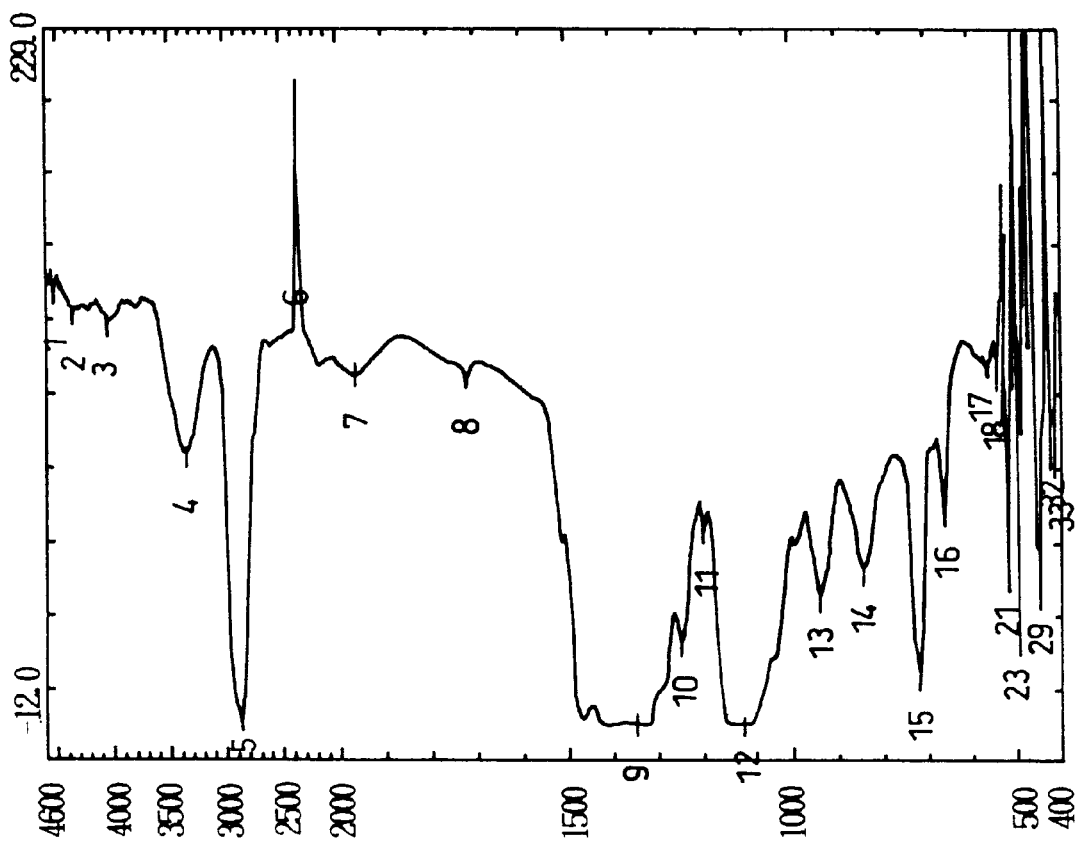
FIG. 1 is an infrared spectrum of an ion conductor substrate of a First Preferred Embodiment according to the present invention.

Having generally described the present invention, a further understanding can be obtained by reference to the specific preferred embodiments which are provided herein for purposes of illustration only and are not intended to limit the scope of the appended claims.

The present ion conductor substrate comprises of a polymer or molecule capable of sustaining ion conduction, and a boroxine ring. The above mentioned polymer or molecule participates in or promote ionic conduction. The boroxine ring is bonded to the above mentioned polymer or molecule, and captures anions resulting from dissolution of a salt. For instance, the present ion conductor substrate contains many boroxine rings, and is usually a soft solid. The boroxine rings trap the anions resulting from the dissolved salt. The polymer or molecule is responsible for sustaining the ionic conduction of cations resulting from the dissolved salt.

In a further aspect of the present invention, the boroxine ring can be a trialkoxyboroxine.

In a further aspect of the invention, the polymer or molecule capable of sustaining ion conduction can preferably include an ether chain. The ether chain can preferably include ethyl ether, or propyl ether units. For example, the ether chain can be one expressed by ($-CH_2-CH_2-O-$). Specifically, the polymer or molecule capable of sustaining ion conduction can preferably have a structure expressed by the following chemical formula (1) and/or (2):

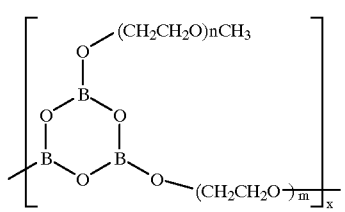

(1)

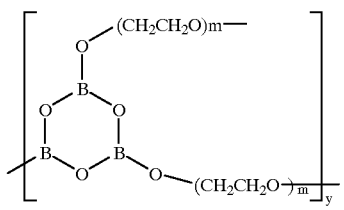

(2)

For example, the present ion conductor substrate can be readily synthesized as follows. The Polyethylene glycol (hereinafter abbreviated to "PEG"), and polyethylene glycol monomethyl ether (hereinafter abbreviated to "PEGMME") are mixed in a predetermined ratio, and boric oxide ($B_2O_3$) is added to the mixture in a predetermined number of moles. Then, the resultant mixture is heated to prepare the present ion conductor substrate. The components are usually solved in a solvent to carry out a dehydration-and-condensation reaction. In addition, the reaction mixture can be admixed with a polyfunctional triol, glycerol propoxylate (hereinafter abbreviated to "GP") to form cross-linking points. As a result, a much harder solid substance can be obtained as the resulting product. The PEG used to prepare the present ion conductor substrate can preferably be one having an ether chain length described by the number of repeat units "n" of from 2 to 9, further preferably from 3 to 9.

Suppose that the proportion of PEG be expressed by (2+a) as recited in the following reaction equations, it can be up to 3 mol, preferably 2.6 mol or less, further preferably 2.0 mol or less.

$3B_2O_3 + (2+a)PEG + (2-2a)PEGMME \rightarrow POLYMER$; or $3B_2O_3 + (2+a-b)PEG + (2b/3)GP + (2-2a)PEGMME \rightarrow POLYMER$.

Moreover, instead of PEG, tetraethylene glycol (hereinafter abbreviated to "TEG") can be employed in the synthesis described above.

The present ion conductor is prepared by adding the salt to the thus prepared present ion conductor substrate. The anions resulting from dissolution of the salt are significantly trapped by the boroxine ring, but the cations resulting therefrom can move freely via the ether chains. As a result, the present ion conductor can exhibit high ion conductivity, which can be ascribed predominantly due to the cation motion, even at room temperature.

As for the electrolyte salt, an alkali metal salt or an alkaline-earth metal salt can be combined for use with the present ion conductor substrate. The alkali metal salt can be a lithium salt. For instance, the lithium salt can be at least one member selected from the group consisting of $Li(CF_3SO_2)_2N$, $LiCF_3SO_3$, $LiBF_4$, $LiClO_4$, $LiBr$, $LiCl$ and $LiPF_6$.

In the present ion conductor, the ratio between the number of the boroxine rings and the number of lithium ions resulting from the lithium salt can preferably fall in the range of from 1 to 20 of the boroxine rings with respect to one lithium ion. In particular, the ratio of the boroxine rings with respect to one lithium ion can furthermore preferably be at around 2:1 (i.e., the number of the boroxine rings:the number of the lithium ions=2:1).

In the polymer or molecule of the thus prepared ion conductor, the boroxine rings work as an anion trap and are present in an appropriate amount. Accordingly, the anions resulting from dissolution of the salt are significantly immobilized by the anion trap. Thus, ion conduction can be carried out where the majority of the charge is carried by the cations and high cation transport can be obtained. The conductivity can be enhanced, because the anion trap formed in the present conductor does not hinder the motion of the cations, which is sustained/promoted by the ether chains. Thus, ion conduction results predominantly from the motion of cations and cation transport numbers can be improved to a level which has not been available so far in ion conductors containing dissolved salts.

The present invention will be hereinafter described in detail with reference to the preferred embodiments. The preferred embodiments of the preferred ion conductor substrate and the present ion conductor were synthesized according to the reaction route set forth in following chemical reaction (3) under the conditions described below:

$$3B_2O_3 + aHO(CH_2CH_2O)mH + bCH_3O(CH_2CH_2O)nH \quad (3)$$

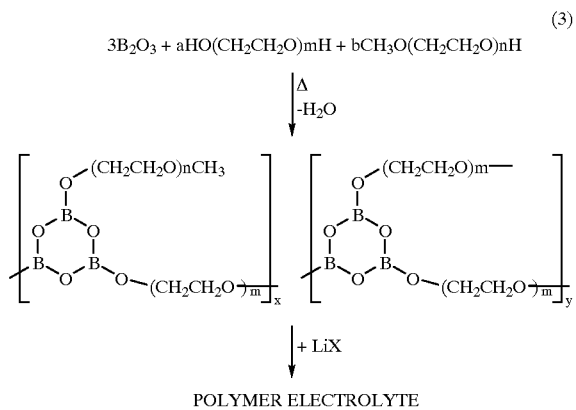

"a" mol PEG and "b" mol PEGMME were dissolved in tetrahydrofuran. For example, PEGMME had a weight average molecular weight of 350. The resultant tetrahydrofuran solution was admixed with 3 mol $B_2O_3$, and was stirred and heated at 120° C. under a nitrogen gas flow to promote the reaction and to remove the tetrahydrofuran and water produced in the reaction. The reaction took about from 4 to 6 hours to complete. Thereafter, the resulting reactant mixture was held at 120 ° C. for about 4 hours to remove the residual water and solvent. The preferred embodiments of the present ion conductor substrate were thus synthesized.

A dried tetrahydrofuran solution was added to the resulting preferred embodiments of the present conductor substrate were added to a dried tetrahydrofuran solution. Note that the dried tetrahydrofuran solution contained a lithium salt in a predetermined ratio with respect to the boroxine rings involved in the preferred embodiments. The mixture was stirred at room temperature for 24 hours until it was homogeneous. Thereafter, the solvent was evaporated to dry the reaction product. The preferred embodiments of the present ion conductor were thus prepared virtually stoichiometrically. Note that the reaction product was handled under a dry nitrogen or argon atmosphere to avoid hydrolysis.

First Preferred Embodiment

The above described synthesis of the present ion conductor substrate was carried out with the following molar composition: 3 mol $B_2O_3$; 1.6 mol PEGMME; and 2.2 mol TEG whose relative boroxine ring content was $Bx:Li^+=2:1$ exhibited. In the resulting polymer (i.e., the present ion conductor substrate), on average, 0.8 methyl terminated oligoether groups were bonded to one boroxine ring. FIG. 1 illustrates the infrared spectrum of the present ion conductor substrate.

According to the infrared spectrum shown in FIG. 1, the structure of the product was determined based on the presence of the peaks in the region 1,300–1,400 $cm^{-1}$ and at 980–1,028 $cm^{-1}$ resulting from the B—O bond, and the presence of the peak at 717–721 $cm^{-1}$ resulting from the boroxine ring.

Figure 2:
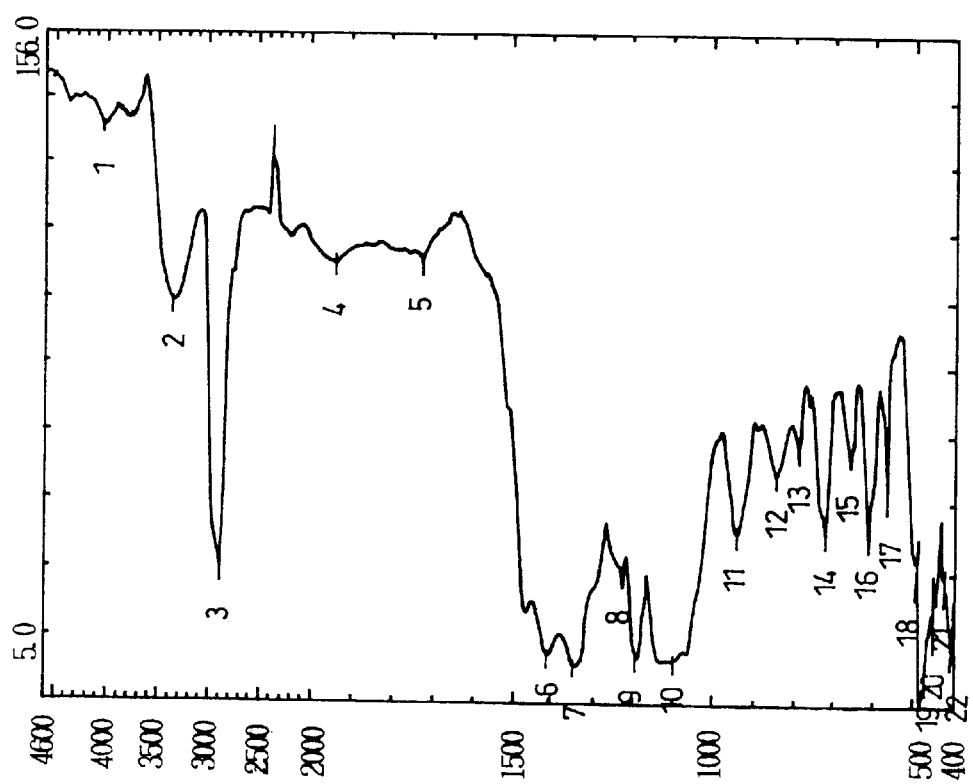
FIG. 2 is an infrared spectrum of an example of ion conductors of the First Preferred Embodiment.

$LiCF_3SO_3$ was added to the present conductor substrate in various amounts so that the following ratios of boroxine rings (Bx) with respect to one lithium ion ($Li^+$) were established: $Bx:Li^+=1:1$, 1.25:1, 2:1, 3:1, 4:1, 10:1 and 20:1. Thus, 7 present ion conductors were synthesized by the above described process. FIG. 2 illustrates the infrared spectrum of one of the 7 present ion conductors whose ratio of boroxine rings with respect to one lithium ion was 2:1 (i.e., $Bx^+:Li^+=2:1$).

Figure 3:
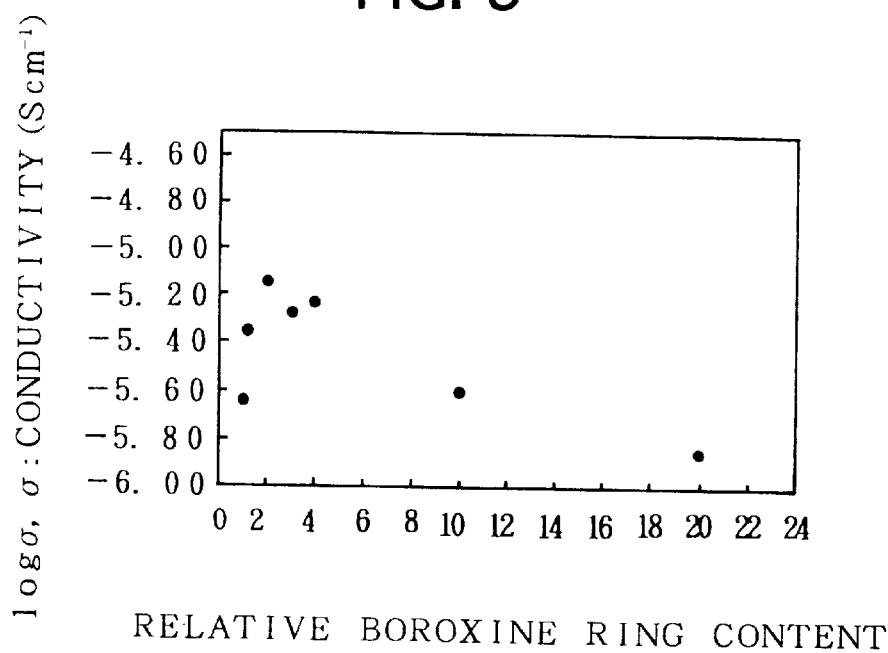
FIG. 3 is a graph illustrating the relationship between the relative boroxine ring content (expressed as the molar ratio of the boroxine ring content with respect to the lithium ion content) and the ion conductivity, the relationship which was exhibited by the ion conductors of the First Preferred Embodiment.

FIG. 3 illustrates the relationship between the ion conductivity and the relative boroxine ring content, the relationship which was exhibited by the present 7 ion conductors. The vertical axis expresses the logarithm to base 10 of the ion conductivity, and the horizontal axis expresses the relative boroxine content as the value $Bx:Li^+$. Note that the present ion conductor whose relative boroxine ring content was $Bx:Li^+=2:1$ exhibited the maximum ion conductivity.

Figure 4:
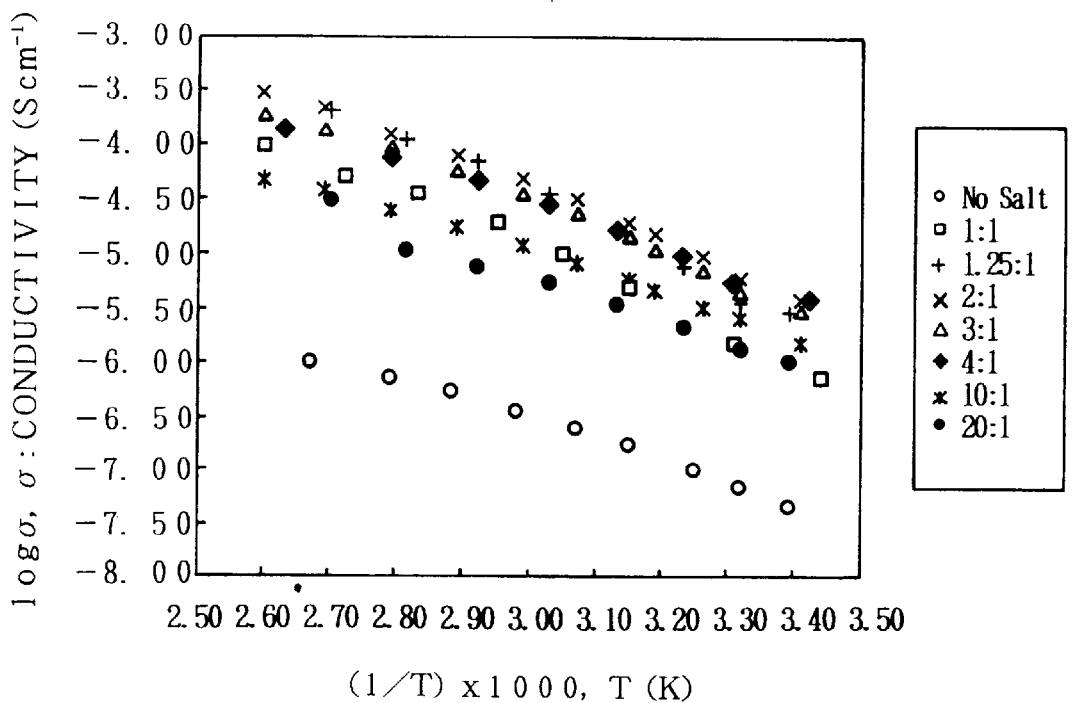
FIG. 4 is a graph illustrating the relationship between the temperature and ion conductivity, the relationship which was exhibited by the ion conductors of the First Preferred Embodiment.

FIG. 4 illustrates the relationships between the ion conductivity and the temperature, the relationship which was exhibited by the present 7 ion conductors. The vertical axis expresses the logarithm to base 10 of the ion conductivity, and the horizontal axis expresses the inverse of the absolute temperature multiplied by a factor of 1,000 (i.e., (1/T)× 1000). Likewise, the present ion conductor whose relative boroxine ring content was $Bx:Li^+=2:1$ exhibited better ion conductivity in the room temperature range than the other present ion conductors.

The ion conductivity was measured in the following manner: the samples (i.e., the present ion conductors) were sandwiched between stainless steel electrodes, and ion conductivity was determined by the AC impedance method. The cation transport number was measured by the AC impedance/DC polarization method.

Second Preferred Embodiment

The above described synthesis of the present ion conductor substrate was carried out by modifying the molar composition as follows: 3 mol $B_2O_3$; (2+a) mol TEG; and (2−2a) mol PEGMME. Likewise, PEGMME had a weight average molecular weight of 350. Accordingly, the synthesis was carried out with the following chemical equation:

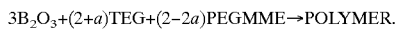

Moreover, the molar content of TEG (i.e., (2+a)) was changed variously for each synthesis as follows: 0, 1.5, 1.8, 2.2, 2.3, 2.5 and 3.0. Then, $LiCF_3SO_3$ was then added to the resulting 7 polymers in order to obtain a boroxine ring: $Li^+$ ratio of 2:1. Thus, 7 ion conductors were synthesized by the above process.

Figure 5:
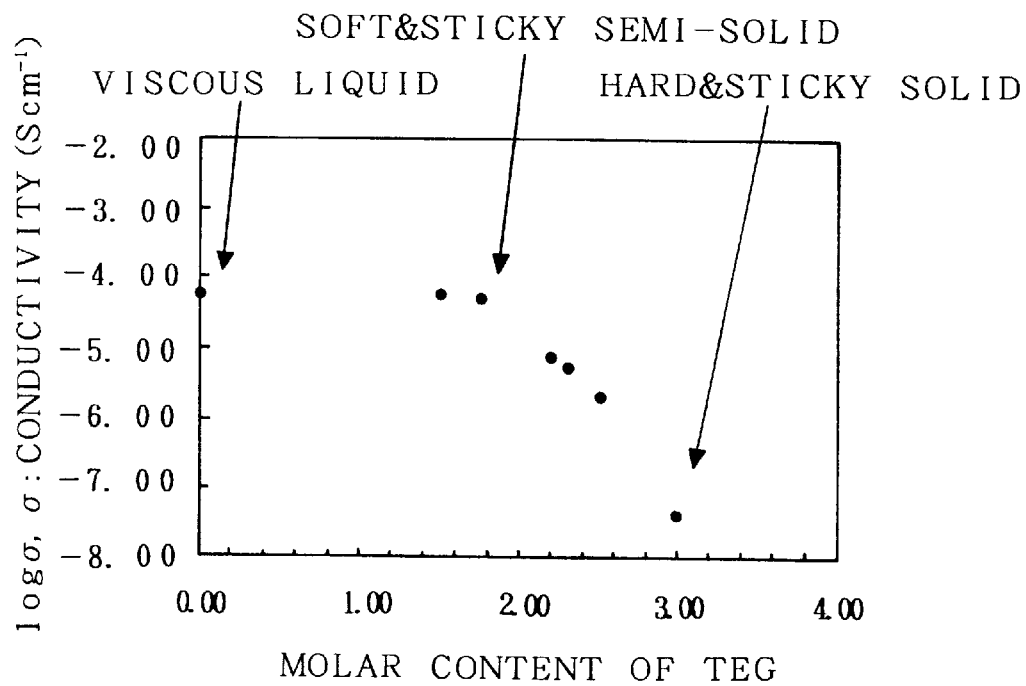
FIG. 5 is a graph illustrating the relationship between the number of mols of tetraethylene glycol (TEG) and the ion conductivity, the relationship which was exhibited by ion conductors of a Second Preferred Embodiment according to the present invention.
Figure 6:
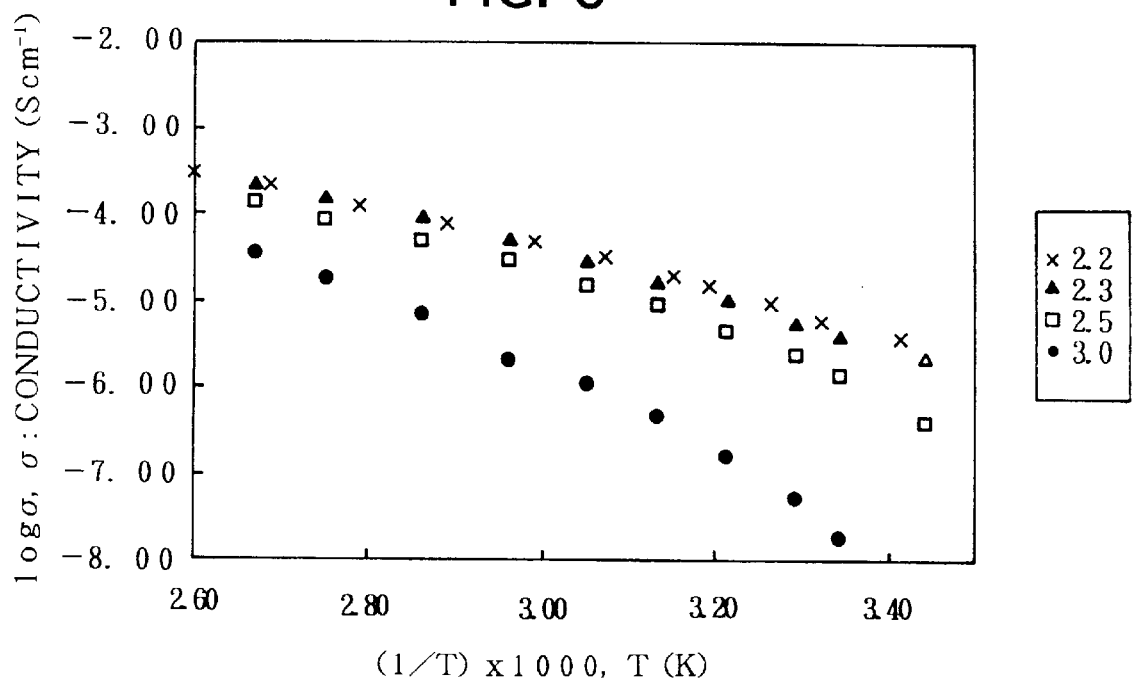
FIG. 6 is a graph illustrating the relationship between the temperature and ion conductivity, the relationship which was exhibited by the ion conductors of the Second Preferred Embodiment.

FIG. 5 illustrates the relationship between the ion conductivity (at 30° C.) and the molar content of TEG (i.e., (2+a)), the relationship which was exhibited by the resultant present 7 ion conductors. FIG. 6 illustrates the relationship between the ionic conductivity and temperature, the relationship which was exhibited by 4 of the present 7 ion conductors whose molar content of TEG (i.e., (2+a)) was 2.2 or more. It can be understood from the graph that as the molar content of TEG (i.e., (2+a)) increased, the ion conductivity decreased. Note that the increment of the molar content of TEG (i.e., (2+a)) means the increment of glycol chains used in the synthesis of the ion conductor substrate. As shown in FIG. 5, the present ion conductors were formed as a viscous liquid when the molar content of TEG (i.e., (2+a)) was 0 mol; they were formed as a soft sticky semi-solid when molar content of TEG (i.e., (2+a)) approached 2 mol; and they were formed as a hard and sticky solid when the molar content of TEG (i.e., (2+a)) was 3 mol.

Third Preferred Embodiment

With the exception that the TEG was replaced with PEG; the PEG chain length described by the number of repeat units "n" was varied in 4 stages (i.e., "n"=2, 3, 4, and 8.7); and the molar composition of $B_2O_3$, PEG and PEGMME was fixed, the present ion conductor substrates of the Third Preferred Embodiment were synthesized as described above. Likewise, PEGMME had a weight average molecular weight of 350. Specifically, the synthesis was carried out according to the following equation:

$3B_2O_3+2.2PEG$ (e.g., $HO(CH_2CH_2O)_nH$)+1.6PEGMME→POLYMER.

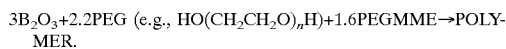

Consequently, cross-links were formed in the polymers and their length varied with the length of the glycol chain. The $LiCF_3SO_3$ was then added to the resulting 4 polymers in order to obtain a boroxine ring:$Li^+$ ratio of 2:1. Thus, 4 ion conductors were synthesized by the above process.

Figure 7:
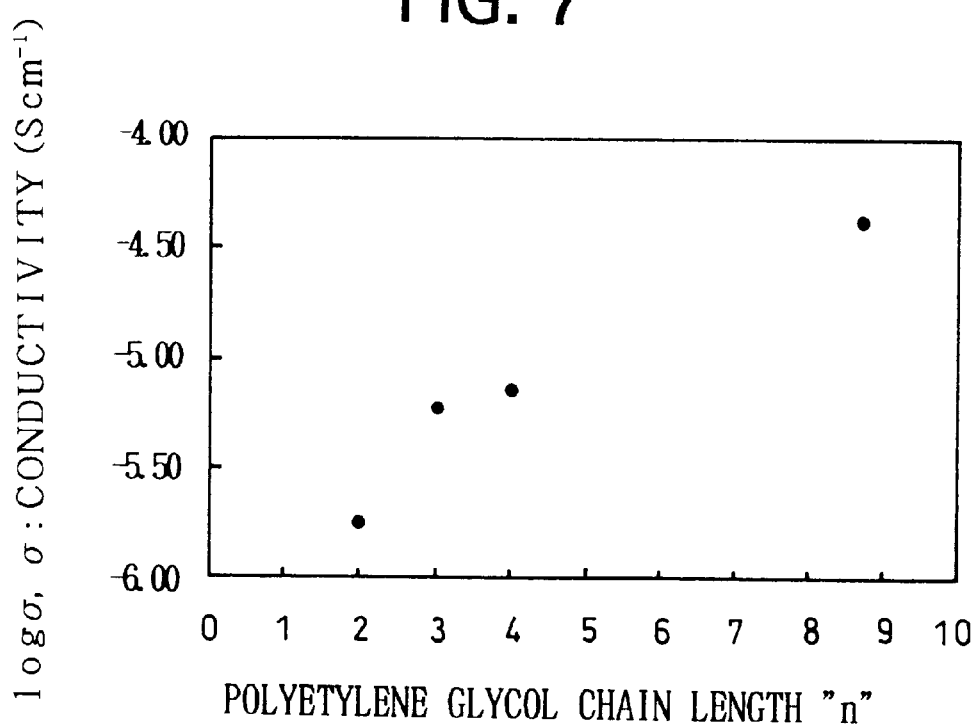
FIG. 7 is a graph illustrating the relationship between the polyethylene glycol chain length and the ion conductivity, the relationship which was exhibited by ion conductors of a Third Preferred Embodiment according to the present invention.

The ion conductivity of the present 4 ion conductors was measured at 30° C. FIG. 7 illustrates the relationship between the ion conductivity and polyethylene glycol chain length described by the number of repeat units "n". As illustrated in FIG. 7, the ion conductivity exhibited by the present ion conductors increased as the polyethylene glycol chain length became longer. When the number of repeat units "n" was 2, the present ion conductors were a yellowish-brown or brownish-yellow hard solid. On the other hand, when "n" was 8.7, the present ion conductors formed a soft semi-solid.

Fourth Preferred Embodiment

The above described synthesis of the present ion conductor substrate was carried out by fixing the molar composition as follows: 3 mol $B_{2O3}$; 2.2 mol TEG; and 1.6 mol PEGMME. Likewise, PEGMME had a weight average molecular weight of 350. Accordingly, the synthesis was carried out according to the following equation:

$3B_2O_3+2.2TEG+1.6PEGMME$→POLYMER.

A variety of lithium salts as listed in Table 1 below were added respectively to the resulting polymer to give a ratio of boroxine ring:$Li^+$ of 2:1 (i.e., Bx:$Li^+$=2:1). Thus, the present 6 ion conductors were synthesized by the above described process together with an identical ion conductor which was free from the lithium salts.

The ion conductivity of the resultant present 6 ion conductors as well as the ion conductor without added lithium salt was measured at 30° C. The results are summarized in Table 1.

TABLE 1

| Electrolyte Salt | σ/Scm$^{-1}$ (at 30° C.) | $t_+$ |
|---|---|---|
| Li(CF$_3$SO$_2$)$_2$N | 1.6 × 10$^{-5}$ | not measured |
| LiCF$_3$SO$_3$ | 7.1 × 10$^{-6}$ | 0.75 (at 35° C.) |
| LiBF$_4$ | 7.3 × 10$^{-6}$ | 0.75 (at 20° C.) |
| LiBr | 9.5 × 10$^{-7}$ | not measured |
| LiCl | 6.6 × 10$^{-7}$ | 0.88 (at 26° C.) |
| LiPF$_6$ | 1.6 × 10$^{-7}$ | not measured |
| None | 7.1 × 10$^{-8}$ | not measured |

As listed in Table 1, the maximum ion conductivity was exhibited by the ion conductors containing Li(CF$_3$SO$_2$)$_2$N as the dissolved salt. Note that the magnitude of the ion conductivity varied with the lithium salt.

Figure 8:
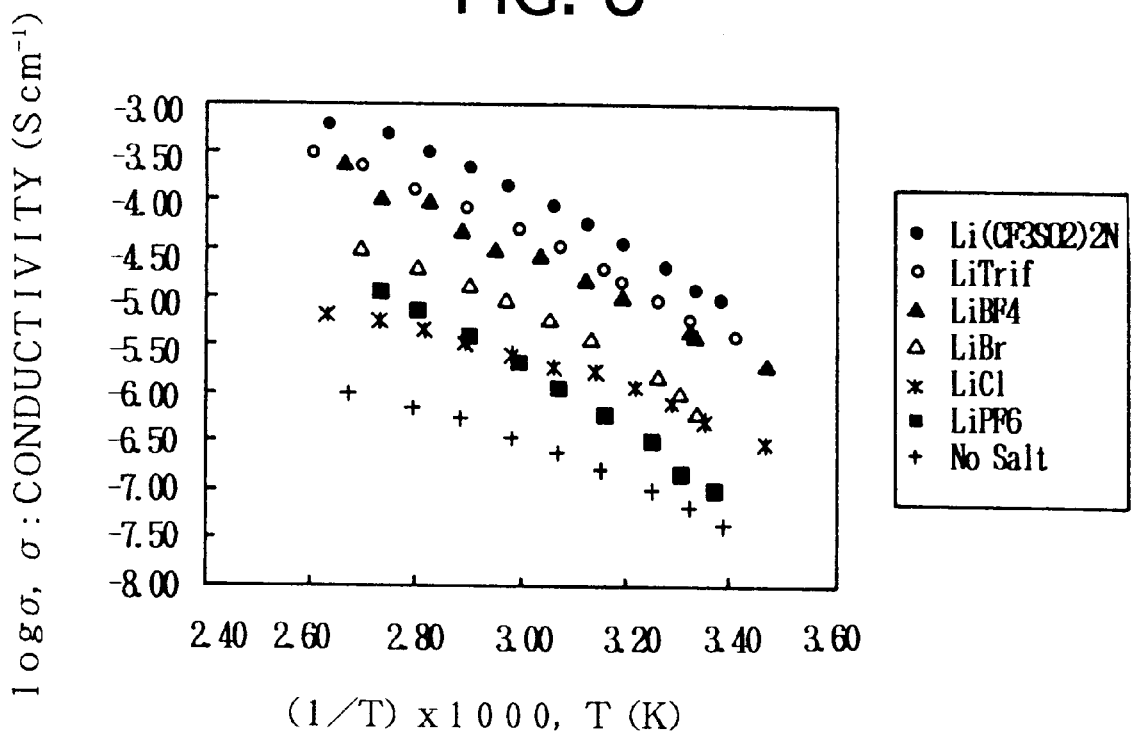
FIG. 8 is a graph illustrating the relationship between the temperature and ion conductivity, the relationship which was exhibited by the ion conductors of the Fourth Preferred Embodiment according to the present invention.

FIG. 8 is a graph illustrating the relationship between ion conductivity and temperature. The relationship was exhibited by the present 6 ion conductors as well as the ion conductor without added lithium salt. Concerning the ion conductivity, an important feature was observed in the system containing LiCl. LiCl usually dissolves negligibly in polyethers which contain only a small proportion of terminal —OH groups. Dissolution of the lithium salt can usually only be effected when the energy of dissolution compensates for the loss of the lattice energy of the salt. Since anion interaction with the polymer is usually negligible, the main factor determining whether a lithium salt will dissolve is the strength of the Li$^+$ interaction with the oxygen atoms on the ether chains. However, as illustrated in Table 1, the ion conductor containing LiCl exhibited a very high Li$^+$ transport number $t_+$ combined with significant ion conductivity. In view of this, it is believed that in this ion conductor, there was a very strong interaction between the anions and the boroxine rings (i.e., the Cl$^-$ ions were trapped by the boroxine rings) which both facilitated dissolution of the LiCl and accounted for the high Li$^+$ transport number. The Li$^+$ transport numbers for the systems containing the salts LiCF$_3$SO$_3$ and LiBF$_4$ were also very high. Accordingly, it is understood that there is a strong interaction between the boroxine rings and the anions of the form illustrated in (4) (a) or (4) (b).

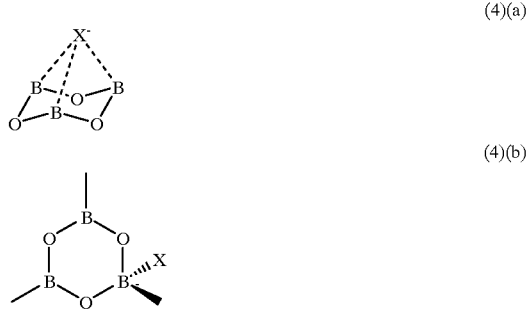

(4)(a)

(4)(b)

In addition, when two of the present ion conductors, those containing LiCF$_3$SO$_3$ and LiBF$_4$ were sandwiched between lithium electrodes and a constant current passed for three days, it was found that at the end of this period the lithium electrodes remained shiny.

Fifth Preferred Embodiment

With the exception that trifunctional GP (i.e., glycerol propoxylate) was added in order to vary the mechanical properties of the resulting polymers; and the molar composition was modified as recited in the following chemical equation, the present ion conductor substrates of the Fifth Preferred Embodiment were synthesized in the same manner as described above. GP had the chemical structure as shown in the following chemical formula (5):

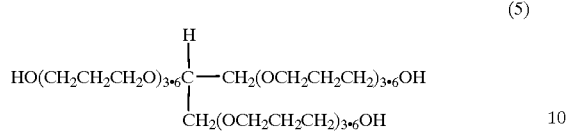
(5)

Likewise, PEGMME had a weight average molecular weight of 350. Accordingly, the synthesis was carried out according to the following equation:

$LiCF_3SO_3$ was added to the resulting 3 polymers to give a boroxine ring: $Li^+$ ratio of 2:1. Thus, the present 3 ion conductors were synthesized by the above-described process.

The ion conductivity of the present 3 ion conductors was measured at 30° C. The results are summarized in Table 2.

TABLE 2

| X: Molar GP Content | $\sigma/Scm^{-1}$ (at 30° C.) |
|---|---|
| 0 | $7.1 \times 10^{-6}$ |
| 0.6 | $1.0 \times 10^{-6}$ |
| 1.47 | $1.5 \times 10^{-7}$ |

As illustrated in Table 2, the ion conductivity decreased as the proportion of GP used increased. The ion conductor containing the maximum proportion of GP (X=1.47) showed extremely good mechanical properties. When the sample was pressed, it was easily deformed but maintained its shape over long periods of time.

According to the literature [(1) J. Evans, C. A. Vincent, and P. G. Bruce, Polymer, 28, 2234, 1987; (2) W. Gorecki, R. Andreani, C. Berthier, M. B. Armand, M. Mali, J. Ross, and D. Brinkman, Solid State Ionics, 18&19, 295, (1985); (3) M. LeVeque, J. F. LeNest, A. Gandini, and H. Cheradame, J. Power Sources, 14,23, (1986); (4) A. Bouridah, F. Dalard, D. Deroo, and M. B. Armand, Solid State Ionics, 18&19, 287, (1986); (5) J. E. Weston and B. C. H. Steele, Solid State Ionics, 7, 81, (1982); (6) P. Ferloni, G. Giodelli, A. Magistris, and M. Sanesi, Solid State Ionics, 18&19, 265, (1986); (7) M. LeVeque, J. F. LeNest, A. Gandini, and H. Cheradame, Makromolekylaire Chemie Rapid Communications, 4, 497, (1983)] $Li^+$ transport numbers for ion conductors formed by the dissolution of a lithium salt in a polyether normally fall in the range 0.15–0.45. Accordingly, it is clear that the ion conductors described in the present invention have much greater $Li^+$ transport numbers than for formed by the dissolution of a lithium salt in a polyether. They also exhibit high ion conductivities at room temperature.

Having now fully described the present invention, it will be apparent to one of ordinary skill in the art that many changes and modifications can be made thereto without departing from the spirit or scope of the present invention as set forth herein including the appended claims.

What is claimed is:

1. A substrate for an ion conductor, comprising:
   a polymer or molecule capable of sustaining ion conduction, the polymer or molecule comprising an ether chain, said either chain is at least one member selected from the group consisting of ether chains containing ethylene oxide and propylene oxide units; and
   a boroxine ring bonded to the polymer or molecule capable of sustaining ion conduction, which captures anions resulting from a dissolved salt.

2. The substrate according to claim 1, wherein said boroxine ring is trialkoxyboroxine.

3. The substrate according to claim 1, wherein the ether chain is expressed by ($—CH_2—CH_2—O—$).

4. The substrate according to claim 1, wherein said polymer or molecule capable of sustaining ion conduction is made from polyethylene glycol and polyethylene glycol monomethyl ether.

5. The substrate according to claim 4, wherein the polyethylene glycol has an ether chain length described by the number of repeat units "n" in the range of from 2 to 9.

6. The substrate according to claim 5, wherein the polyethylene glycol is tetraethylene glycol.

7. The substrate according to claim 1, wherein said polymer or molecule capable of sustaining ion conduction is made from polyethylene glycol, polyethylene glycol monomethyl ether and triol glycerol propoxylate.

8. The substrate according to claim 7, wherein the polyethylene glycol has an ether chain length described by the number of repeat units "n" in the range of from 2 to 9.

9. The substrate according to claim 8, wherein the polyethylene glycol is tetraethylene glycol.

10. An ion conductor, comprising:
    the substrate set forth in claim 1; and
    a salt combined with the substrate.

11. The ion conductor according to claim 10, wherein said salt is at least one member selected from the group consisting of an alkali metal salt and an alkaline-earth metal salt.

12. The ion conductor according to claim 11, wherein the alkali metal salt is a lithium salt.

13. The ion conductor according to claim 12, wherein the alkali metal salt is at least one member selected from the group consisting of $Li(CF_3SO_2)_2N$, $LiCF_3SO_3$, $LiBF_4$, $LiClO_4$, LiBr, LiCl and $LiPF_6$.

14. The ion conductor according to claim 12, wherein the ratio between the number of said boroxine rings and the number of lithium ions resulting from the lithium salt falls in the range of from 1 to 20 with respect to one lithium ion.

* * * * *

UNITED STATES PATENT AND TRADEMARK OFFICE
CERTIFICATE OF CORRECTION

PATENT NO. : 6,210,838 B1
DATED : April 3, 2001
INVENTOR(S) : Tatsuo Fujinami et al.

It is certified that error appears in the above-identified patent and that said Letters Patent is hereby corrected as shown below:

Title page,
The following is added:
-- [73] Assignee: Toyota Jidosha Kabushiki Kaisha, Toyota (JP)
                  Genesis Research Institute, Inc., Nagoya (JP) --

Signed and Sealed this

Twenty-eighth Day of May, 2002

Attest:

*Attesting Officer*

JAMES E. ROGAN
*Director of the United States Patent and Trademark Office*